United States Patent [19]
Artis

[11] Patent Number: 5,234,833
[45] Date of Patent: Aug. 10, 1993

[54] POLYHEDRAL COMPOSTER

[76] Inventor: Henry Artis, 2029 N. 23rd St., Boise, Id. 83702

[21] Appl. No.: 759,418

[22] Filed: Sep. 13, 1991

[51] Int. Cl.⁵ ............................................. C12M 1/16
[52] U.S. Cl. .................................. 435/299; 435/312; 435/315; 422/184; 422/209
[58] Field of Search ............... 435/287, 299, 311, 312, 435/313–316, 818; 422/184, 209; 71/8–10, 14, 23, 11–13; 366/101, 105, 107, 219, 220, 225; 220/908; 52/DIG. 10; 423/DIG. 18

[56] References Cited
U.S. PATENT DOCUMENTS

| | | | |
|---|---|---|---|
| 3,837,810 | 9/1974 | Richards et al. | 71/9 |
| 3,934,999 | 1/1976 | Meier | 71/9 |
| 4,687,645 | 8/1987 | Harvey | 422/184 |
| 4,797,367 | 1/1989 | Pinder | 435/313 |

FOREIGN PATENT DOCUMENTS

| | | | |
|---|---|---|---|
| 0210382 | 2/1987 | European Pat. Off. | 435/312 |
| 1111988 | 5/1986 | Japan | 435/312 |
| 2056391 | 3/1987 | Japan | 435/284 |

Primary Examiner—Michael G. Wityshyn
Assistant Examiner—William H. Beisner
Attorney, Agent, or Firm—Frank J. Dykas; Craig M. Korfanta; Ken J. Pedersen

[57] ABSTRACT

A polyhedron composting container (10) is disclosed having an access door panel (15) and interior turning tines (18). The polyhedron composter (10) is advantageously manufactured from identical equilateral triangles which can snap or fasten together by bolts or the like. Vents (20) are provided either in the individual panels (11) or by hollow tines (18), or both. Here composter (10) is manufactured in the shape of a isocahedron to facilitate aeration through easy turning and further to simplify loading and unloading of composter (10).

5 Claims, 10 Drawing Sheets

POLYHEDRAL COMPOSTER

BACKGROUND OF THE INVENTION

1. Technical Field

This invention generally relates to structures for manufacturing compost, and more particularly, this invention relates to a composting bin having a polyhedral-geodesic shape to facilitate optimum mixing of the compost and maximize microbial activity.

2. Background Art

Composting is the natural biological process by which organic waste is converted into soil constituents by microorganisms. Recently, there has been a large amount of interest in composting as an alternative means of dealing with organic household and yard wastes due to the high cost, limited availability and potential environmental impact of traditional landfill waste disposal. The emphasis on composting results from the desire to reduce the amount of waste deposited in landfills or incinerated in waste processing plants.

Consequently, several devices, methods and catalysts have been developed to improve composting efficiency and make the process more convenient. In general, the efficiency of the composting process is controlled by the nutrient content of the waste and the composting environment. The present invention is concerned with the composting environment.

Because composting is an aerobic process it is critical that the waste mass or "heap" receive an adequate supply of oxygen. In fact, oxygen is the single most important limiting factor in the rate of compost production, all other things being equal. Since the optimal water content is approximately 45% to 60%, excess water which would tend to suffocate the aerobic process must be drained away. Additionally, the waste mass should be agitated to ensure that fresh air is available to the bacteria. The later requirement poses the biggest problem for home composters as the shear bulk of the waste mass is cumbersome when contained in a bin and unruly when uncontained. Depending on the moisture content of the waste mass, the entire pile should be turned at least once every other day and as much as twice a day to ensure the maximum rate of compost production.

U.S. Pat. No. 4,797,367 to J. A. Pinder describes an aerobic domestic composting device which utilizes an air diffusing device in connection with a plastic bag lined drum. The primary objective of this device being to promote aeration of the composting heap without allowing insects and the like from infesting the heap.

U.S. Pat. No. 3,837,810 to A. Z. Richards and L. S. Madsen describes a rotatable composter which is essentially a rectangular bin rotatably mounted about horizontally disposed axis. The bin is selectively rotated to agitate and aerate the composting heap. Stationary lifters or lugs, disposed on the central axle, act to both aerate and agitate the heap.

U.S. Pat. No. 4,687,645 to C. D. Harvey describes a composting apparatus which uses a 55 gallon drum-like container having a horizontal transverse axis to facilitate end for end rotation of the drum. A perforated pipe is provided along the longitudinal axis of the drum to promote aeration of the composting heap.

U.S. Pat. No. 3,934,999 to H. R. Meier describes the use of a plastic bag as a composting container which permits agitation of the heap by "fluffing" or kicking the bag. Perforations are provided in the side walls of the bag to promote aeration of the heap. The primary drawback to this device is the necessary size limitation due to the lack of structural integrity of the flexible bag. In order to maintain a self generating compost heap in colder climates, it is generally accepted that the heap mass should have a volume of at least a cubic yard of material. Also, because the volume of compost produced is anywhere from 20% to 30% of the original volume of waste material, a 30 gallon plastic bag is only capable of producing a few cubic feet of compost at the most. It can easily be appreciated that in order to construct a flexible plastic bag having a larger volume, the necessary thickness of the side walls of the bag would defeat the objects of the invention. Simply limiting the thickness of the container to that necessary to maintain a flexible plastic bag would result in the bag tearing, not to mention the inability of a single person to manipulate the heap. Additionally, as the size of the heap is increased, it becomes more important to provide some interior means to agitate the heap. Finally, it is evident that the plastic bag is difficult to roll and transport.

It is therefore an object of the present invention to provide a composting container which enables a single person to frequently, easily and conveniently agitate its contents and thereby facilitate the composting rate. It is a further object of this invention to provide a composting container which is easy to assemble. It is a further object of this invention to provide a composting container which can be loaded and unloaded with a minimum effort expended. It is a further object of this invention to provide a composting container which is easy to clean and which requires minimal maintenance.

DISCLOSURE OF INVENTION

These and other objects are accomplished by a composting container manufactured in the shape of a hollow regular polyhedron having an access panel and interior tines. The polyhedron is advantageously manufactured from identical equilateral triangles which can snap or fasten together by bolts or the like. A particularly advantageous embodiment uses diamond shaped panels having two equilateral triangular facets. Vents are provided either in the individual panels, by hollow tines, or both.

While the exact number of facets of the polyhedral isn't critical, the present inventor has found that twenty, an icosahedron, is an optimum number. This allows the panels to be of a manageable size and enables the icosahedron to be easily rolled from facet to facet to sufficiently agitate the heap and at the same time provides a sufficient volume to both allow continued microbial activity by generating enough heat to sustain the activity in colder climates and to produce an appreciable amount of compost.

BEST MODE FOR CARRYING OUT INVENTION

Figure 1:
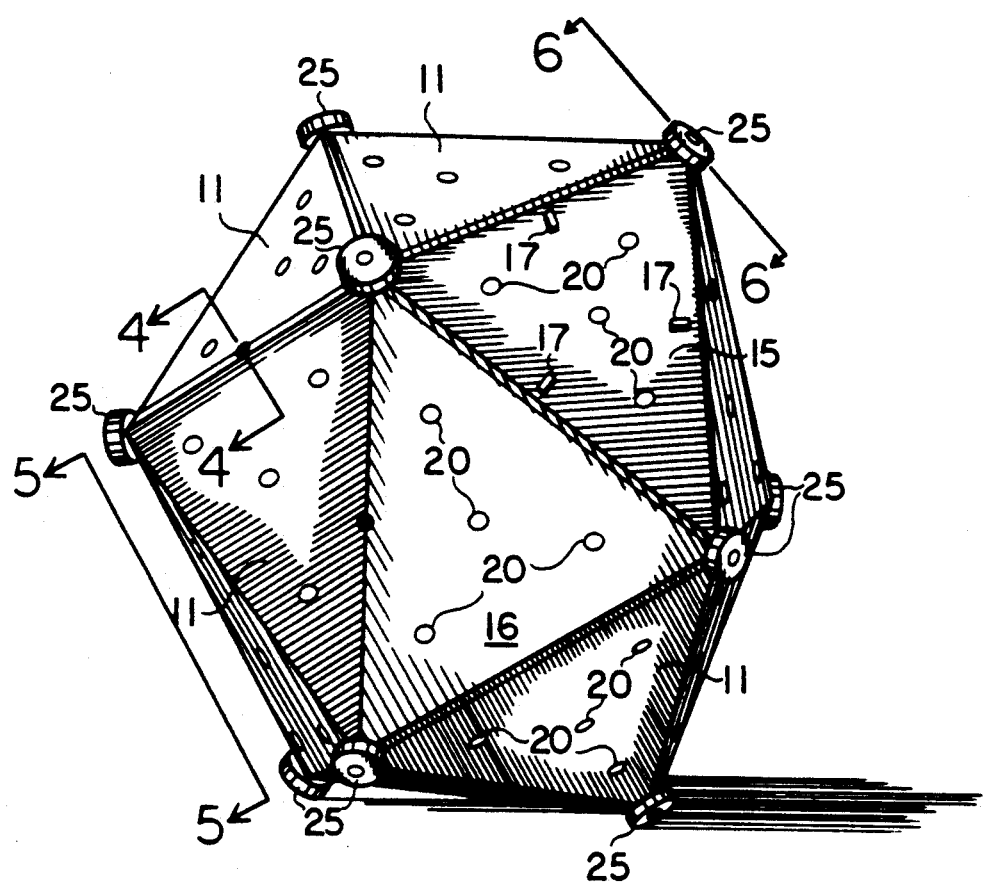
FIG. 1 is a three-quarter view of polyhedron composter constructed according to the principles of the instant invention.
Figure 2:
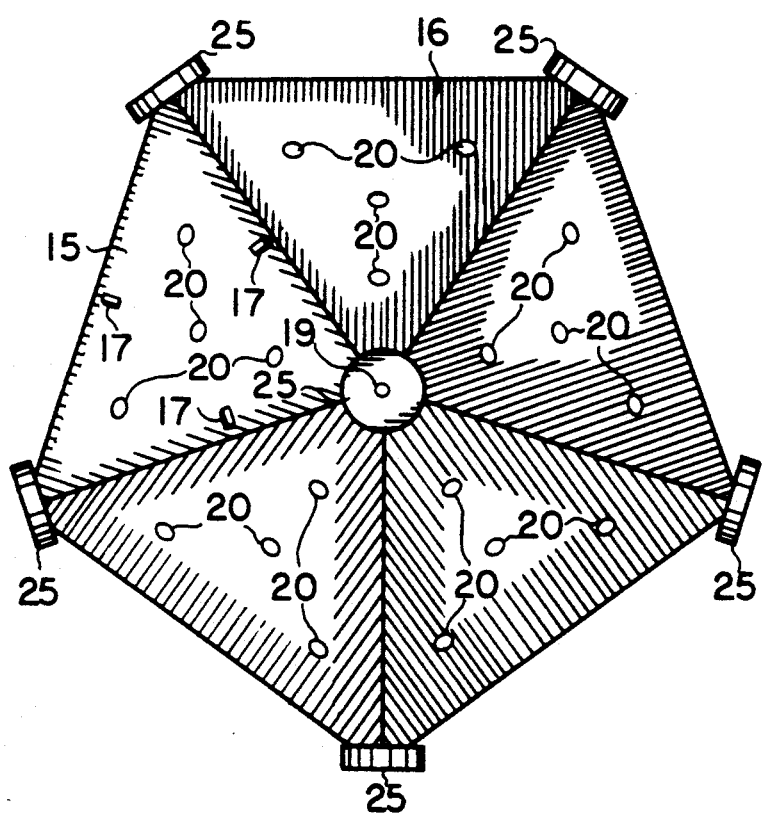
FIG. 2 is a top view of the polyhedron composter.
Figure 3:
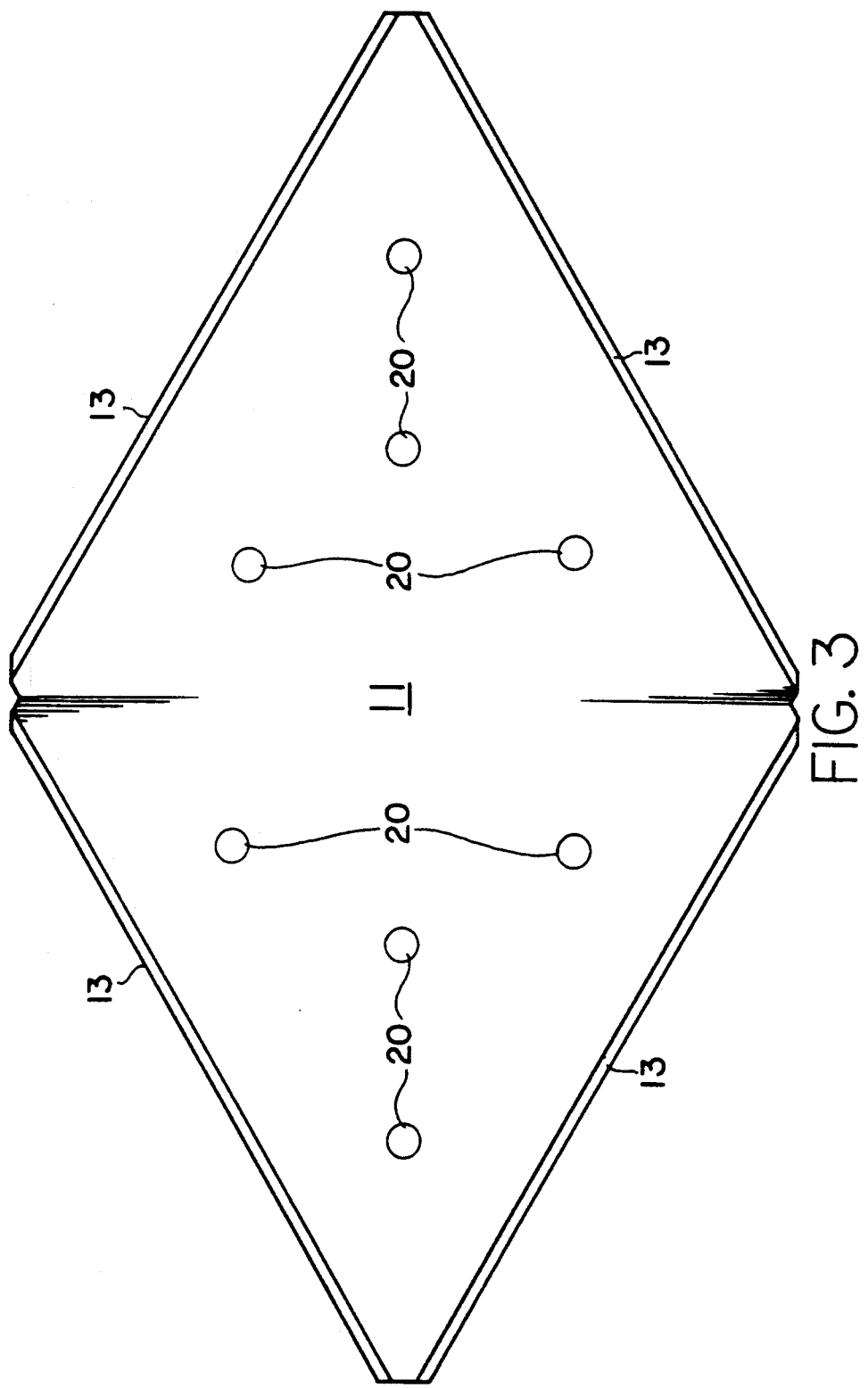
FIG. 3 is a bottom view of a diamond shaped panel composed of two equilateral triangular shaped panels.
Figure 4:
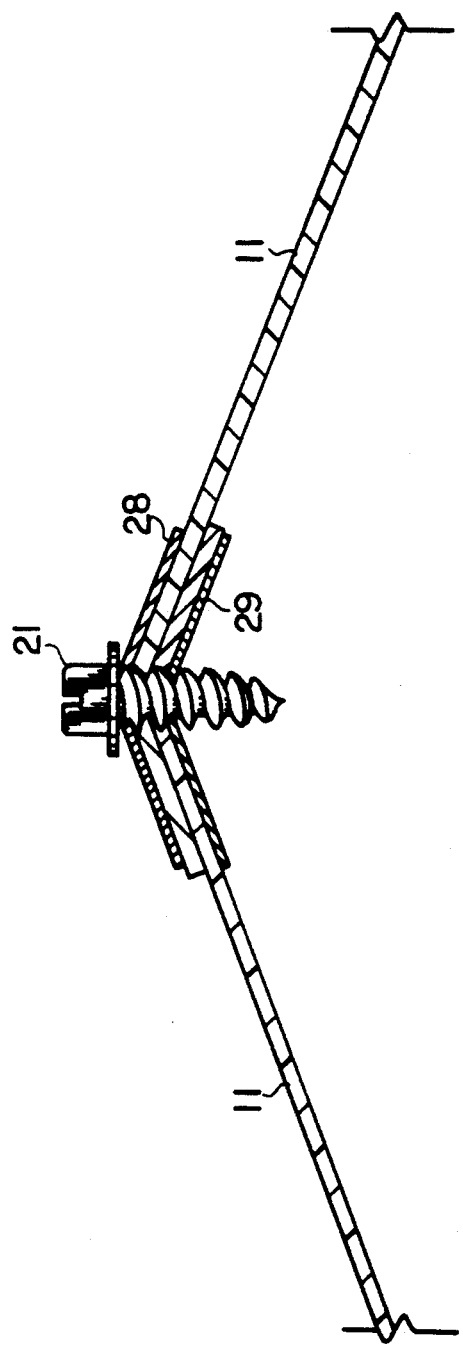
FIG. 4 is a partial interior view of the seam between two adjoining panels showing a first fastening system, taken along section line 4 of FIG. 1.
Figure 5C:
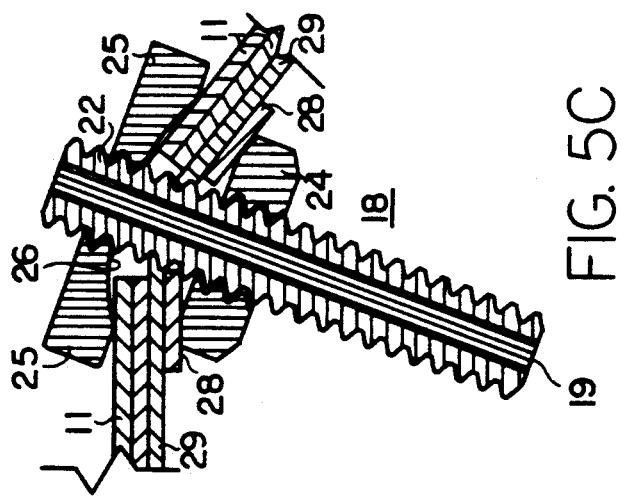
FIG. 5A, FIG. 5B and FIG. 5C are partial interior views of the seam between two adjoining panels showing a first fastening system, taken along section line 5 of FIG. 1.
Figure 5B:
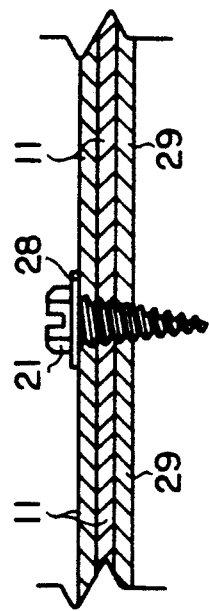
Figure 5A:
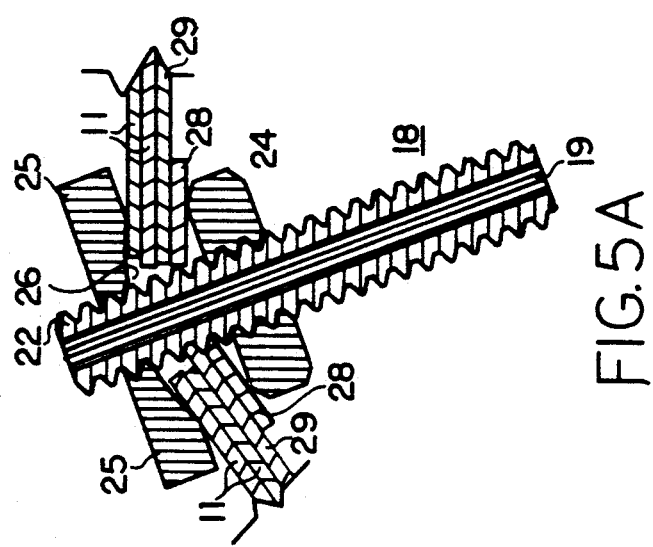

With reference to the drawings, polyhedral composter 10 is generally constructed from multiple panels 11 being joined at their edges by a suitable fastening means. Here, panels 11 are each formed in the shape of a diamond, which can be best described as two equilateral triangles, each having identical dimensions and are joined together along a common edge. Each of the triangles lies in a coordinate plane wherein the obtuse angle of the two coordinate planes defines the interior angle, or dihedral angle, of the final polyhedron. Diamond shaped panels 11 are joined together at their edges to form two facets of the polyhedron shaped container. While the number and dimensions of the facets of the polyhedron are not critical to the invention, the capacity or volume of the container is important. It is fairly well accepted in the art that in order for the heap to generate enough heat to sustain the microbial action in cold climates there must be approximately one cubic yard of organic waste material. It is also a convenient size in that it is large enough to compost a significant amount of waste and yet still is quite manageable for a single person. The inventor has found that a polyhedron having twenty facets, an icosahedron, is optimal in that the container is not too difficult to roll and yet is stable enough to resist unwanted rolling.

The inventor has successfully used equilateral triangular facets having an edge dimension of approximately twenty-seven inches to obtain an icosahedron having a volume of a little more than one cubic yard and overall diameter of approximately four feet three inches. Panels 11 can be manufactured from various materials such as sheet metal, plywood, or the like, and advantageously can be manufactured from new or recycled high density polyethylene (HDPE). In cold climates the panels can be manufactured from dark colors such as black or green to absorb the solar radiation and help maintain the interior of composter 10 at a temperature above freezing. However, in hotter climates, or during hotter seasons, microbial activity declines in temperatures above approximately 170° fahrenheit so lighter colors may be more desirable. Additionally, when using plastics such as HDPE, it may be desirable to include ultraviolet inhibitors to prolong the structural integrity of the plastic.

In the first preferred embodiment, panels 11 are manufactured from a UV resistant polyethylene plastic in the form of identical diamond shaped panels 11, each having a fair of identically sized equilateral triangular facets having an edge dimension of twenty-seven inches. Advantageously, a series of vent holes 20 are provided in panels 11 to promote the flow of fresh air into and around the heap. In this first embodiment, an over-lapping fastening system is employed to join panels 11 together. The overlapping fastening system employs a lip 13 extending from each edge of panels 11 such that all the panels 11 are identical. In this manner, a single mold can be used to produce all of the panels with the exception of the door panel 15 and door mount panel 16. For an icosahedron, the interior angle between the facets of panel 11 and lips 13 is approximately 138°.

Panels 11 are fastened together by overlapping lips 13 and screwing lips 13 together using a suitable sheet metal screw or the like. Additional strength can be added to the structure by a series of strap members 29 connected together on the interior of the structure. Strap members 29 are connected together at the apexes of the polyhedron utilizing turning tines 18 and extend generally along the adjoining edges of panels 11. Additionally, each strap member 29 is connected at its center to the joint of two panels 11 by the sheet metal screw used to join the panels together. Conical shaped washers 28 are used both at the apexes of the structure and with sheet metal screws 21 to provide purchase surfaces for the cooperating components.

Figure 8:
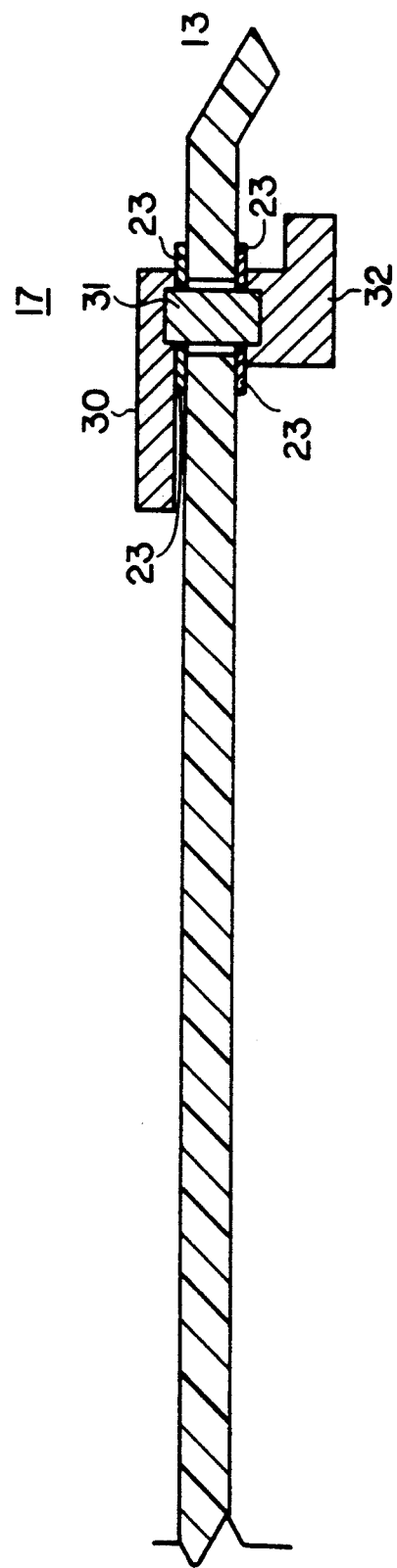
FIG. 8 is a side sectional view of the door panel, taken along section line 8 of FIG. 7, showing the door closure means.

Access to composter 10 is provided through an opening formed by substituting a single triangular door mount panel 16 for a diamond shaped panel 11. A second triangular panel, door panel 15, forms a removable door. The triangular panels can be formed separately or by severing any one of the diamond shaped panels 11. Each edge of door panel 15 is provided with a lock or catch 17 which cooperates with the corresponding edges on adjacent panels 11 and door mount panel 16 to lock the door into place. As can be readily seen in FIG. 8, door catches 17 each consist simply of an "L" shaped catch member 32 radially secured to one end of axle 31, while a handle 30 is radially attached to the other end of axle 31. Axle 31 is rotatably attached through door panel 16 using flat washers 23 such that upon rotating handle 30 through an arc of 90°, "L" shaped catch 32 will frictionally engage the overlapping lip 13 of any adjacent panel 11. Alternatively, the panels 11 which form part of the door opening could be manufactured having with cooperating catch and/or locking means.

Figure 6:
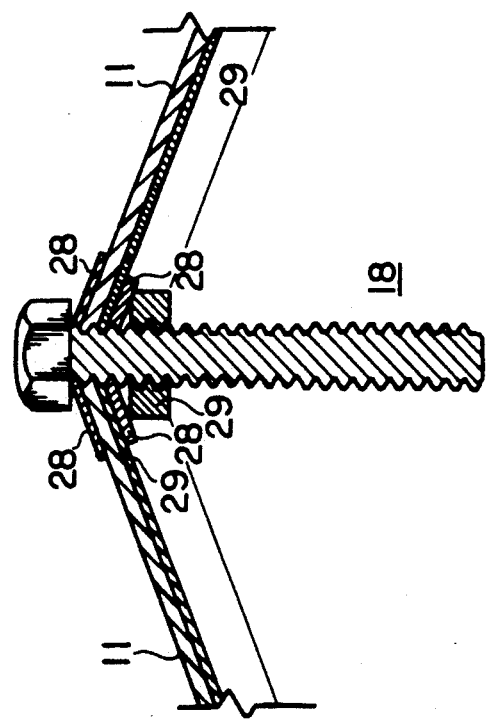
FIG. 6 is a side sectional view of the turning tine assembly taken along section line 6 of FIG. 1.
Figure 7:
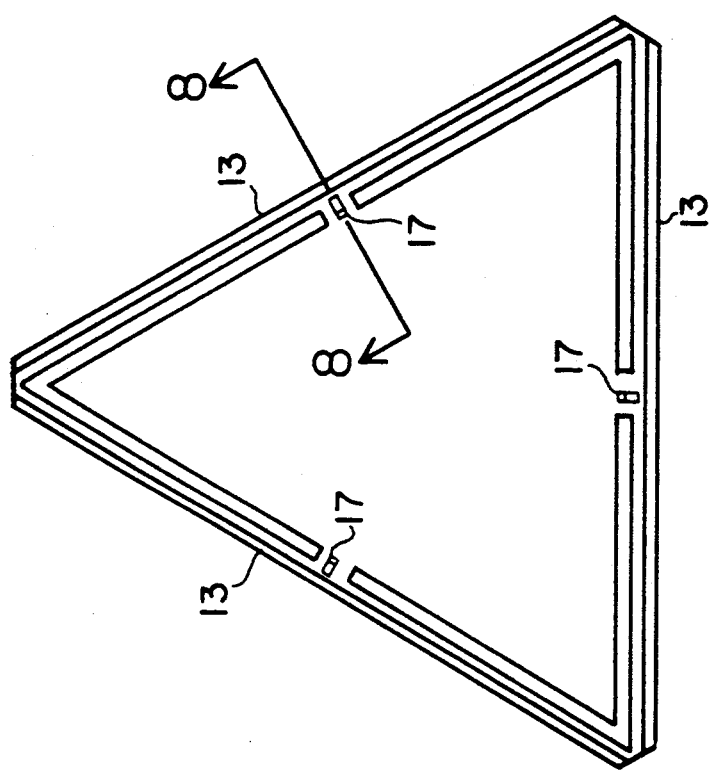
FIG. 7 is a bottom view of a triangular door panel.

Tines 18 are provided to facilitate aeration of the heap by breaking the heap up when composter 10 is rolled. Tines 18 can be as simple as bolts 28 which protrude into the interior of composter 10 as is shown if FIG. 6, or they can be much more sophisticated, including an air passage 19 to promote oxygenation of the heap. While tines 18 may be positioned at virtually any place on the various panels, the present inventor has successfully positioned them at both the apex points where five panels come together and along the seems where any two panels are joined. In fact, using a construction employing nuts and bolts to fasten the panels together, as discussed below, the bolts can act both as tines and to help hold panels 11 together.

Here, turning tines 18 include a hollow shaft having a threaded end at 22, an interior conical washer 28 and stop nut 24 thereon and an exterior hockey puck shaped nut 25 for threadedly engaging the threaded end 22. Nut 25 includes a concave interior surface 26 to receive the apex formed by the joining together of five panel triangular facets. Hollow turning tines 18 are attached within the interior of composter 10 by inserting thread end 22 out through a hole in the apex of the composter, engaging the inside apex edges of panels 11 against washer 28, and engaging surface 26 with panels 11 by tightening nut 25 onto threaded end 22. The concave interior surface 26 acts to receive the apex and secure the corners of panels 11 together. The air passage 19 within tine 18 will allow fresh air to penetrate the heap and thereby increase the composting rate. It should be appreciated that tines 18 need not necessarily be hollow as adequate aeration is provided by vents 20, at least for the aforementioned dimensions.

Figure 9:
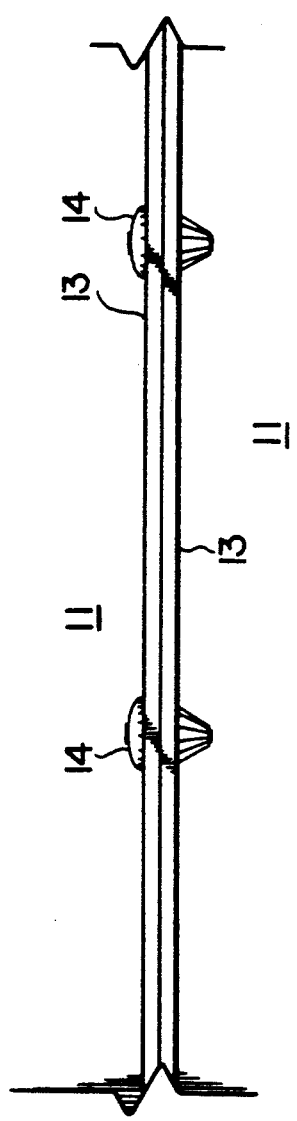
FIG. 9 is a partial interior view of the seam between two adjoining panels showing a second fastening system.
Figure 10:
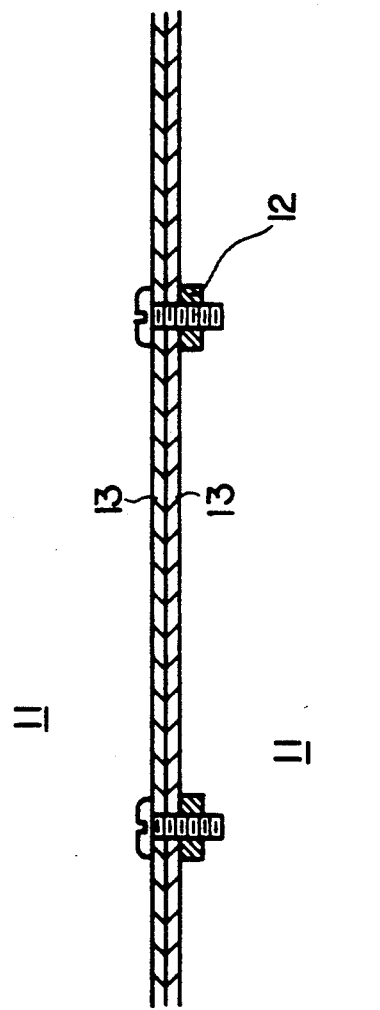
FIG. 10 is a partial interior view of the seam between two adjoining panels showing a third fastening system.

A second fastening system is shown in FIG. 9 of the drawings, the individual panels 11 being formed with depending lips 13 along each edge, lips 13 including holes 12 for receiving fasteners. Here, lips 13 are broken at an angle equal to one-half the dihedral, which in this case corresponds to one-half of 138° or 69°. In this second fastening system, plastic self spreading rivets 14 hold the two adjacent panels 11 together. A third fastening system substitutes standard bolts and nuts for plastic rivets 14, as is shown in FIG. 10.

A second embodiment of the polyhedral composter 10 uses equilateral triangular shaped panels for each facet. The triangular panels are joined together using any of the previously discussed fastening means, as well as any other suitable fastener.

In use, compostable material is loaded into the interior of composter 10 through access door panel 15. Depending on the moisture content of the compostable material, water can be added to raise the moisture content to a point between 45% and 60% by weight. Access door panel 15 is then closed and secured. Approximately once a day, composter 10 is rolled around on the ground, changing directions frequently, relative to the center point of the composter, for several rotations. By changing directions of the composter 10 as it is rolled, the heap is sufficiently agitated to allow a fresh inflow of air to oxygenate the heap. Once the composting process is complete, the access door panel 15 is opened and composter 10 is rolled to dispose the opening at or near the bottom to facilitate removal of the compost.

The present inventor has successfully converted a cubic yard of grass clippings to black compost in 14 days using this apparatus and the above method.

While there is shown and described the present preferred embodiment of the invention, it is to be distinctly understood that this invention is not limited thereto but may be variously embodied to practice within the scope of the following claims.

I claim:

1. A composting bin comprising:
    a hollow, regular polyhedron container means for receiving compostable material into its interior, said regular polyhedron consisting of facets of equilateral triangles;
    airflow means for promoting the flow of air into the interior of the container means; and
    access means for loading compostable material into and for unloading compost from the interior of the container means.

2. The composting bin of claim 1 wherein the regular polyhedron has 20 facets.

3. The composting bin of claim 1 wherein the airflow means comprises a plurality of vent holes in the facets of the polyhedron.

4. The composting bin of claim 1 wherein the access means comprises a moveable facet.

5. The composting bin of claim 1 which also comprises tines which protrude into the interior of the container means for agitating compostable material within the container means upon rolling of the container means.

* * * * *